United States Patent
Arletti et al.

(10) Patent No.: US 7,942,572 B2
(45) Date of Patent: May 17, 2011

(54) PROCESS FOR THE CONTINUOUS PRODUCTION OF EMULSIONS

(75) Inventors: Arrigo Arletti, Modena (IT); Paolo Vincenzi, Rovigo (IT)

(73) Assignee: Basell Poliolefine Italia s.r.l., Milan (IT)

( * ) Notice: Subject to any disclaimer, the term of this patent is extended or adjusted under 35 U.S.C. 154(b) by 1218 days.

(21) Appl. No.: 10/575,751

(22) PCT Filed: Sep. 30, 2004

(86) PCT No.: PCT/EP2004/010943
§ 371 (c)(1), (2), (4) Date: Apr. 13, 2006

(87) PCT Pub. No.: WO2005/039745
PCT Pub. Date: May 6, 2005

(65) Prior Publication Data
US 2007/0097784 A1 May 3, 2007

Related U.S. Application Data

(60) Provisional application No. 60/512,640, filed on Oct. 20, 2003.

(30) Foreign Application Priority Data

Oct. 16, 2003 (EP) .................................... 03103838

(51) Int. Cl.
*B01F 3/08* (2006.01)
(52) U.S. Cl. ............................ 366/264; 366/263; 415/66
(58) Field of Classification Search ............... 366/155.1, 366/164.6, 263, 264; 415/66, 68
See application file for complete search history.

(56) References Cited

U.S. PATENT DOCUMENTS

| | | | | | |
|---|---|---|---|---|---|
| 951,162 | A | * | 3/1910 | Wedekind | 415/66 |
| 1,290,505 | A | * | 1/1919 | Bulley | 366/83 |
| 1,335,775 | A | * | 4/1920 | Wiberg | 415/66 |
| 1,442,945 | A | * | 1/1923 | Hauk | 62/68 |
| 1,489,786 | A | * | 4/1924 | Povey et al. | 241/251 |
| 1,489,787 | A | * | 4/1924 | Povey | 241/163 |
| 1,727,152 | A | * | 9/1929 | Winkler | 366/263 |
| 1,976,955 | A | * | 10/1934 | Maclean | 366/264 |
| 2,070,545 | A | * | 2/1937 | Gilbert | 366/164.6 |
| 2,461,276 | A | * | 2/1949 | Hetherington | 508/539 |
| 2,767,965 | A | * | 10/1956 | Daman | 261/87 |
| 2,785,635 | A | * | 3/1957 | Johnson | 417/244 |
| 3,131,877 | A | * | 5/1964 | Budzien | 241/251 |
| 3,161,402 | A | * | 12/1964 | Willems | 366/118 |
| 3,233,876 | A | * | 2/1966 | Faure et al. | 366/171.1 |

(Continued)

FOREIGN PATENT DOCUMENTS
DE 2722906 11/1978
(Continued)

*Primary Examiner* — David L Sorkin
*Assistant Examiner* — Andrew Janca
(74) *Attorney, Agent, or Firm* — Dilworth IP LLC

(57) ABSTRACT

A multistage process for the continuous production of an emulsion comprising subjecting at least two immiscible liquids to a sequence of at least two mixing stages carried out in at least two successive stator-rotor devices, wherein a peripheral outlet from a first stator-rotor device is connected to an axial inlet in the successive stator-rotor device by means of a duct in which the Reynold number $Re_T$ inside said duct is higher than 5000, and the peripheral velocity of each rotor of said stator-rotor devices ranges from 5 to 60 m/s.

15 Claims, 2 Drawing Sheets

U.S. PATENT DOCUMENTS

| | | | |
|---|---|---|---|
| 4,089,835 A * | 5/1978 | Konig et al. | 524/100 |
| 4,294,549 A * | 10/1981 | Thompson et al. | 366/170.3 |
| 4,399,054 A * | 8/1983 | Ferraris et al. | 502/125 |
| 4,469,648 A * | 9/1984 | Ferraris et al. | 264/9 |
| 4,499,194 A * | 2/1985 | Harada et al. | 502/8 |
| 4,850,704 A | 7/1989 | Zimmerly et al. | 366/263 |
| 5,360,868 A * | 11/1994 | Mosier et al. | 525/89 |
| 5,632,596 A | 5/1997 | Ross | 415/83 |
| 5,643,506 A | 7/1997 | Rourke | 264/4.1 |
| 5,662,650 A | 9/1997 | Bailey et al. | 606/59 |
| 5,665,796 A | 9/1997 | Hosokawa et al. | 523/322 |
| 5,885,920 A * | 3/1999 | Takahashi et al. | 502/228 |
| 6,000,840 A | 12/1999 | Paterson | 366/264 |
| 6,127,304 A * | 10/2000 | Sacchetti et al. | 502/125 |
| 6,323,152 B1 * | 11/2001 | Sacchetti et al. | 502/169 |
| 6,388,028 B2 * | 5/2002 | Sacchetti et al. | 526/124.3 |
| 6,861,385 B2 * | 3/2005 | Arletti et al. | 502/150 |
| 7,307,035 B2 * | 12/2007 | Sacchetti et al. | 502/102 |
| 7,482,413 B2 * | 1/2009 | Morini et al. | 526/124.2 |
| 2002/0031553 A1 * | 3/2002 | Moyano et al. | 424/491 |
| 2003/0096699 A1 * | 5/2003 | Arletti et al. | 502/172 |
| 2004/0020643 A1 * | 2/2004 | Thomeer et al. | 166/250.01 |

FOREIGN PATENT DOCUMENTS

| | | | |
|---|---|---|---|
| EP | 673677 A1 * | 9/1995 | |
| WO | 9908782 | 2/1999 | |
| WO | 02051544 | 7/2002 | |

* cited by examiner

PROCESS FOR THE CONTINUOUS PRODUCTION OF EMULSIONS

The present invention relates to a process for the continuous preparation of emulsions having an uniform size distribution of the droplets forming the dispersed phase of the emulsion.

In particular, the present invention relates to a process for the continuous preparation of emulsions containing, as dispersed phase, droplets of a molten adduct of magnesium halide-Lewis base, in which emulsion the size distribution of the droplets is particularly narrow.

The most immediate and specific application of the present invention is the production in continuous of emulsions which, after a cooling step, allows to obtain solid particles of a magnesium dihalide-Lewis base adduct having a more uniform size distribution. The obtained solid particles, in view of their narrow particle size distribution, can be advantageously used as a support in the preparation of supported catalysts for the polymerization of olefins.

It is known that industrial mixers and emulsifiers are used to blend various materials, such as adhesives, coatings, cosmetics, foods, plastics, etc. Generally, high speed and hydraulic shearing forces are created inside the industrial mixers by rotating a rotor relative to a stator: the fluids are fed axially into the rotor-stator assembly and dispersed radially outward from the rotor-stator assembly. When two immiscible liquids are subjected to high speed and hydraulic shearing forces, one liquid can disperse in the form of droplets (dispersed phase) inside the second one (continuos phase) causing the formation of an emulsion. The average size of the droplets in the dispersed phase is directly correlated to the intensity of the energy supplied by the rotor. Generally, the higher is the stirring energy, the smaller is the average size of the droplets obtained as dispersed phase of the emulsion. Another important parameter, which greatly influences the final size of the obtained droplets, is the degree of coalescence during the emulsifying process. In such processes the droplets of the emulsion are substantially in dynamic equilibrium between the breakup involved by the shearing action and the coalescence phenomena tending to aggregate the droplets. The coalescence of the droplets causes an increase of the final average size of the droplets obtained at the outlet of the process, thus increasing considerably the fraction of coarse particles. Such coalescence phenomena are contrasted by the shearing action caused by the movement of the rotor. In the mixing zones close to the rotor the shearing action is intense and, consequently, droplets having a small size are formed. Moving away from the rotor, the shearing action decreases and the coalescence phenomena increase, so causing an increase of the size of the droplets. Bigger droplets are formed in the zones of mixing at some distance from the rotor. As a consequence, the obtained emulsion shows a non-uniform size distribution of the droplets.

U.S. Pat. No. 5,622,650 discloses a process for emulsifying a hydrophobic fluid and a hydrophilic fluid in order to obtain emulsions, particularly oil-in-water emulsions. Said oil-in water emulsions are employed in the preparation of microcapsules for use in the manufacture of carbonless copy papers. Such emulsifying process makes use of a milling machine comprising a mill body having a substantially cylindrical cavity therein. The milling machine further comprises a plurality of annular, concentric rows of stator projections and a plurality of annular, concentric rows of rotor projections, wherein the annular rows of stator projections are concentrically adjacent to, and are nested or intermeshed within, the annular rows of rotor projections. The fluids entering the mill pass through shear zones of increasing intensity, before reaching the outer periphery of the rotor member. The fluids flow radially through a first milling space and axially through a second milling space, within the close peripheral clearance between the knurled outer circumference of the rotor member and the inside wall of the cavity, before the fluids reach the mill outlet. The most important feature of the milling machine of U.S. Pat. No. 5,622,650 is the use of a single pass continuous feed process to produce emulsions having a more uniform particle size. Said single pass process is specific for the preparation of, microcapsules for use in the manufacture of carbonless copy papers and is not industrially transferable to the preparation of emulsions which, once quenched, can give solid particles to be used for preparing supported catalysts.

U.S. Pat. No. 5,643,506 describes a process for preparing microcapsules having a substantially uniform size distribution, which comprises continuously forming an oil-in-water emulsion, in which the hydrophobic phase is about 45% to 95% by volume and the hydrophilic phase is about 5 to 55% by volume and where the particle size of the emulsion is controlled by adjusting the oil to water ratio within the aforesaid ranges. When referring to the preparation of solid catalyst components, it is surely preferable to avoid the regulation of the particle size distribution by changing the ratio between the dispersed phase and the continues phase. For instance, a reduction of the amount of the dispersed phase causes a consequent reduction of the generated solid particles bringing to an unacceptable decrease of the process productivity. Furthermore, the process of U.S. Pat. No. 5,643,506 discloses the addition of particular chemical compounds (isocyanates) to the hydrophobic phase and to the hydrophilic phase. The addition of such chemical compounds causes a modification of the physical and chemical characteristics of the obtained emulsion. This technique cannot be applied to the preparation of solid catalytic components, since the above chemical compounds can cause a drastic reduction of the activity of the final catalyst.

U.S. Pat. No. 5,632,596 relates to a rotor-stator assembly for producing sub-micron droplet size liquid-liquid emulsions, this rotor-stator assembly being exploitable in a variety of mixing operations, e.g. mixing, emulsifying, homogenizing, dissolving, dispersing, blending, etc. The particular configuration of the rotor-stator assembly of U.S. Pat. No. 5,632,596 causes an increase of the shearing action on the liquid mixture to be treated. Said rotor-stator assembly includes a rotor and a stator, each of which has a plurality of teeth wherein the height of the teeth is less than approximately one twentieth the diameter of the rotor-stator.

U.S. Pat. No. 6,000,840 relates to rotor-stator assemblies suitable for industrial mixers and emulsifiers, the mechanical configuration of which represents an alternative to that described in U.S. Pat. No. 5,632,596. The particular configuration of the rotor-stator assemblies of U.S. Pat. No. 6,000,840 allows transmitting increased and/or additional high speed shearing forces and increased pressures on the treated mixture. The stator of U.S. Pat. No. 6,000,840 comprises a plurality of openings, said plurality of openings being arranged in pairs in a generally V-shaped pattern. The rotor of the above assembly comprises a plurality of blades and means for supporting said blades for rotation about an axis of rotation, wherein at least one of said blades comprises a surface disposed at an oblique angle relative to said axis of rotation.

Both the above rotor-stator assemblies of U.S. Pat. Nos. 5,632,596 and 6,000,840 are aimed to improve the mixing effect in a single mixing stage and do not take in any consideration the coalescence phenomena occurring downstream the mixing stage. As above explained, the coalescence phenomena are particularly relevant in causing an increase of the size of the droplets and, as a consequence, the obtained emulsions are characterized by a non-uniform size distribution of the droplets.

The high degree of coalescence in the above conventional prior art techniques is an undesirable effect, since, when the coalescence phenomena are out of control, the formation of emulsions with droplets in the dispersed phase having a non-uniform, broader size distribution is caused. Such drawback has to be necessarily minimized, especially when the obtained emulsion has to be used for preparing supported catalysts for the polymerization of olefins. In fact, a size distribution of the support as much as possible narrow is highly desirable in this specific application.

In view of the above, it would be desirable to have available a process for continuously preparing emulsions wherein the coalescence phenomena are considerably minimized and wherein the efficiency of the process, in term of energy transferred to the fluids, is increased.

It has been now found a process for preparing emulsions of two immiscible liquids, in which process the coalescence phenomena are minimized, thus obtaining emulsions characterized by a narrow size distribution of the droplets in the dispersed phase.

It is therefore an object of the present invention a multi-stage process for the continuous production of an emulsion comprising subjecting at least two immiscible liquids to a sequence of at least two mixing stages carried out in at least two successive stator-rotor devices, in which process:

a peripheral outlet from a first stator-rotor device is connected to an axial inlet in the successive stator-rotor device by means of a duct in which the Reynold number $Re_T$ inside said duct is higher than 5000, and the peripheral velocity of each rotor of said stator-rotor devices ranges from 5 to 60 m/s.

The peripheral velocity of a rotor disk is generally defined as the product of angular rotation velocity multiplied for the radius of the rotor itself.

The Reynolds number relative to the movement of a fluid inside a tube ($Re_T$) is defined by the formula $Re = D \cdot v \cdot d / \eta$ in which D is the diameter of the tube, v is the linear velocity of the fluid, d is its density and $\eta$ is the dynamic viscosity.

According to the process of the present invention, the mixing of two or more immiscible liquids is carried out in one or more rotor-stator devices, each mixing stage being connected to the successive one by means of one or more ducts connecting a peripheral outlet from a stator-rotor device to an axial inlet in the successive stator-rotor device.

Throughout the present specification, the term "peripheral outlet" means that the outlet is placed in proximity of the outer circumference of the rotor, the term "axial inlet" means that the inlet is placed in the central portion of the stator-rotor device, that is to say in proximity of the rotor axis.

The process of the invention will be now described with reference to the preparation of an emulsion comprising, as the dispersed phase, a molten adduct of magnesium dihalide-Lewis base, and as the continuous phase, any liquid being inert and immiscible with respect to said adduct of Mg dihalide-Lewis base.

Said inert and immiscible liquid is preferably an organic liquid selected from aliphatic and aromatic hydrocarbons, silicone oils, liquid polymers or mixtures of said compounds. Paraffin oils and silicone oils having a viscosity between 30 cSt and 300 cSt at room temperature are particularly preferred.

As regards the feeding ratio of the above components, the molten adduct of magnesium dihalide-Lewis base is fed to the first mixing stage with a weight ratio of generally less than 0.5, preferably of less than 0.3, with respect to the above inert and immiscible liquid.

It has been unexpectedly found that when the above indicated values of peripheral velocity (5-60 m/s) and $Re_T$ (>5000) are imposed, a minimization of the coalescence phenomena throughout the process of emulsification is obtained. In particular, the best results in term of minimization of the coalescence phenomena and improvement of droplets size distribution are obtained when the following process parameters are satisfied:

Reynold number $Re_T$ higher than 8000 inside each duct;
Peripheral velocity of the rotor disk in the range from 20 to 60 m/s;
Residence time of less than 1 second in each mixing stage.

The residence time into a mixing stage is defined as the ratio between the volume occupied by the liquid in the mixing stage and the volumetric rate at the outlet from the mixing stage.

According to the process of the present invention, the above-indicated immiscible liquids are fed to a first mixing stage carried out in a first stator-rotor device. The inlet of the two liquids is placed in proximity of the rotor axis (axial inlet), so that the entering liquids are forced by the rotation of the rotor to flow from the rotor axis towards the peripheral rim of the rotor. In this way the above liquid components run at a great velocity inside the restricted space comprised between the stator and the rotor surface. Due to the strong stirring and shearing action involved by the rotation of the rotor, an emulsion of the above liquids is formed. Due to the mutual immiscibility, the molten adduct of magnesium dihalide-Lewis base is caused to be dispersed in the form of little droplets in the liquid fed as the continuos phase.

When the obtained emulsion reaches the peripheral region of the first mixing stage, it is forced to enter a duct connecting a peripheral outlet from the first stator-rotor device to an inlet placed in the central portion of a successive stator-rotor device. The transfer of the emulsion along the connecting duct is achieved by exploiting the energy provided by the first rotor disk. Once introduced inside the second mixing stage, the emulsion is forced by the rotation of a second rotor disk to flow at a great velocity from the rotor axis towards the peripheral rim of the rotor. The same effects, as in the first stage, are obtained in the second mixing stage in term of shearing and stirring. When the emulsion reaches the peripheral area of the second mixing stage, it is forced to enter another duct connecting a peripheral outlet from the second stator-rotor device to an axial inlet in the successive stator-rotor device.

In view of the intense shearing action provided by each rotor disk, a turbolent flow is established when the emulsion runs through the ducts connecting the mixing stages each other. As explained above, the Reynolds number $Re_T$ of the emulsion inside the connecting ducts is generally higher than 5000. It should be noted that values of Re below 2000 correspond to laminar flow, while values of Re above 4000 correspond to a turbulent flow. The zone between 2000 and 4000 is the so-called transition zone. The connecting ducts have preferably a spiral shape: this improves the efficiency of the process in term of reduction of the coalescence phenomena between a mixing stage and the successive one. The mixing stages successive to the first one have the function of improving the efficiency of the process of emulsification by increasing the amount of energy provided to the fluids. The obtained emulsion is then discharged from the last mixing stage through a peripheral outlet placed in correspondence of the last rotor-stator device.

In the emulsifying process of the present invention the mixing energy is provided to the fluids more uniformly with respect to the prior art processes. The multistage process of the present invention is particularly innovative, because it allows to use more stages of mixing overcoming the prior art problems caused by the coalescence phenomena between one stage and the successive one. In fact, the size distribution of the droplets obtained at the outlet of each mixing stage is maintained substantially unchanged at the inlet of the successive mixing stage by effect of the specific connection linking the stator-rotor devices. By virtue of the high turbulence intensity ($Re_T>5000$) provided inside each connecting duct, the process of the present invention allows to minimize the coalescence phenomena between each emulsifying stage. As a consequence, the results obtained in the first mixing stage in term of size distribution of the droplets can be transferred without any substantial modification to the second mixing stage where the droplets size distribution is further improved. This is the most relevant advantage provided by the present invention. In fact, the minimization of the coalescence phenomena allows the preparation of an emulsion characterized by a more uniform distribution of the droplets.

The same amount of energy may be transmitted to the liquid components in each mixing stage or, alternatively, an increasing amount of energy can be transmitted passing from a mixing stage to the successive one. In fact, it is possible to increase the energy provided in a rotor-stator device by properly increasing the peripheral velocity of the rotor or, in alternative, by decreasing the tolerance existing between the lateral surface of the rotor and the walls of the corresponding stator. Also by means of the use of rotor disks having a different thickness, it is possible to modify said tolerance, so increasing or decreasing the energy provided into a mixing stage.

According to a preferred embodiment, the process of the invention comprises a sequence of three mixing stages.

As regards the molten adduct of magnesium dihalide-Lewis base, the use of $MgCl_2$ as a magnesium dihalide is preferred. The Lewis base forming the adduct with the Mg dihalide is preferably selected from the group consisting of amines, alcohols, esters, phenols, ethers, polyethers and aromatic or aliphatic (poly)carboxylic acids. Among them, particularly preferred are the alcohols of formula ROH in which R is an alkyl group containing from 1 to 10 carbon atoms.

Especially preferred molten adducts used in the present invention are those of formula $MgCl_2.mROH.nH_2O$, wherein m=0.1-6.0, n=0-0.7 and R has the meaning given above. Among them particularly preferred adducts are those in which m ranges from 2 to 4, n ranges from 0 to 0.4 and R is an ethyl group.

It is another object of the present invention an apparatus for the continuous production of an emulsion comprising at least two stator-rotor devices, each stator except the last being connected with the successive stator by a duct extending from a peripheral outlet in the first stator to an axial inlet in the successive stator. Preferably, the initial portion of said ducts is oriented in a direction substantially tangential to the circumference of each rotor and the terminal portion of said ducts is oriented in a direction substantially parallel to the rotation axis of each rotor.

The efficiency of the above apparatus in term of minimization of the coalescence phenomena is improved when the ducts conveying the emulsion from a rotor-stator device to the successive one are shaped as a spiral.

Each rotor is generally perforated by one or more small holes allowing the liquids of the emulsion to pass from one side to the other side of the rotor itself. In such a way, both the spaces comprised between the lateral surfaces of each rotor and the corresponding stator are exploited and subjected to the shearing action exerted by the rotor. Optionally, the circumference of each rotor may be slightly notched in order to prevent coalescence phenomena in the layer of fluid more adjacent to the stator, wherein the coalescence phenomena are more likely to occur.

The axial tolerance between each rotor and the corresponding stator is generally comprised in the range from 0.1 to 2.0 mm, preferably from 0.2 to 1.2 mm. The axial tolerance may be defined as the distance comprised between the lateral surface of a rotor and the surface of the corresponding stator.

The radial tolerance, intended as the radial distance between the circumference of each rotor and the corresponding stator, is generally comprised between 0.2 mm and 5.0 mm, preferably between 0.5 and 2.0 mm.

The above values of axial and radial tolerances can be easily selected by a simple change of the dimensions of the rotor disks. This is an advantage providing simplicity to the construction and maintenance of the apparatus.

As said, the apparatus of the invention comprises at least two rotor-stator devices. In a preferred embodiment of the invention, the apparatus comprises three rotor-stator devices and the axial tolerance between the rotor disk and the corresponding stator is decreasing from a mixing stage to the successive one.

A scheme of the process and apparatus of the present invention is given with reference to the accompanying drawings, which are given for an illustrative purpose, not limiting the scope of the invention.

Figure 1:
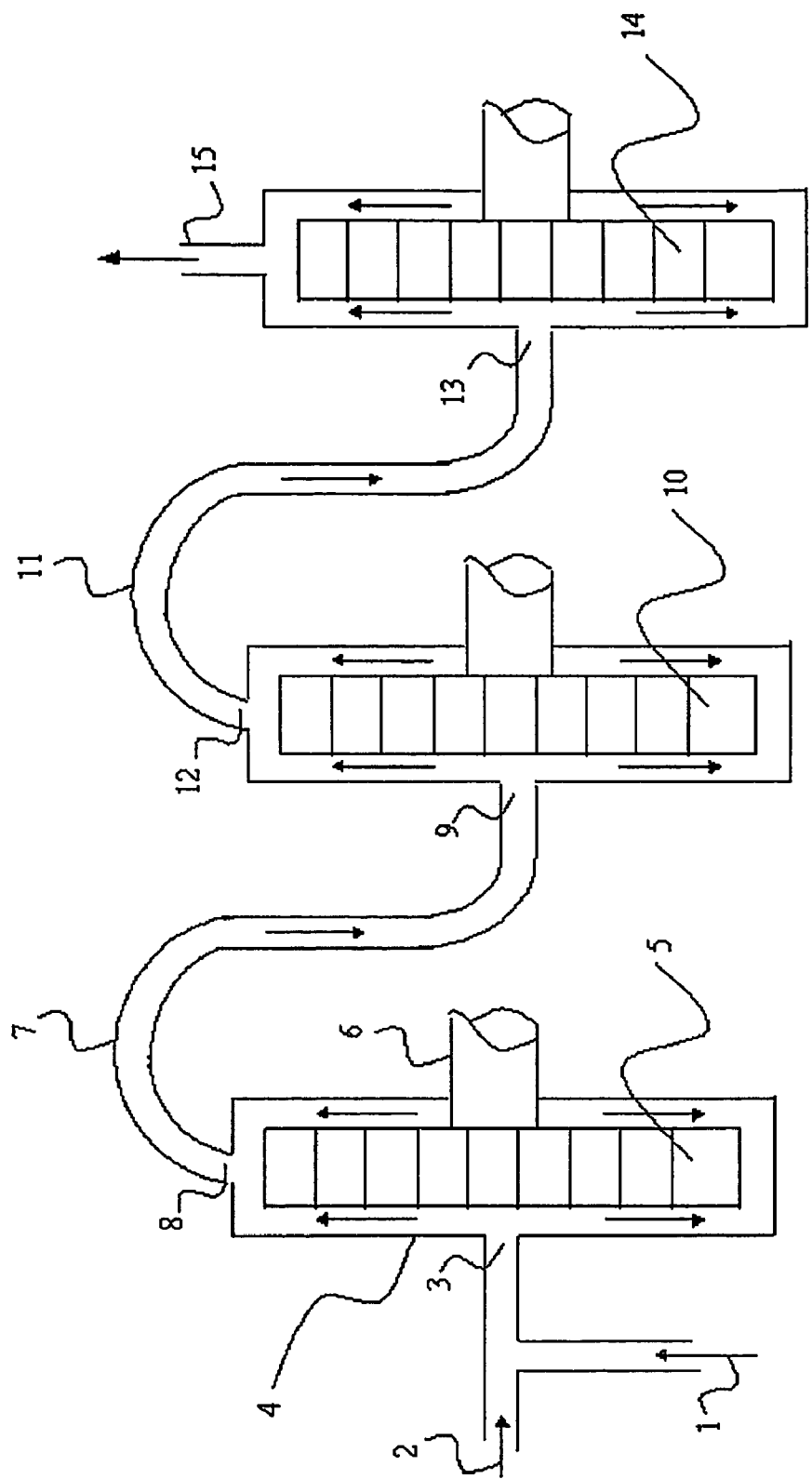
FIG. 1 is a representation of the process and apparatus of the invention, where a sequence of three mixing stages is shown.

With reference to FIG. 1, a stream 1 containing the molten adduct of Magnesium dihalide-Lewis base and a stream 2 containing an inert and immiscible liquid are fed to a first mixing stage carried out in a first stator-rotor device. An axial inlet 3 is provided in the stator 4, so that the entering liquids are forced by the rotation of the rotor 5 to flow from the rotor axis 6 towards the peripheral rim of the rotor. In this way the liquid components run at a great velocity inside the restricted space comprised between the stator 4 and the lateral surface of rotor 5.

Due to the strong stirring and shearing action involved by the rotation of the rotor 5, an emulsion of the above liquids is formed. When the emulsion reaches the peripheral region of the first mixing stage, it is forced to enter a duct 7 connecting a peripheral outlet 8 from the first stator-rotor device to an axial inlet 9 placed in the central portion of the successive stator-rotor device.

Once introduced inside the second rotor-stator device, the emulsion is forced by the rotation of a second rotor 10 to flow at a great velocity from the rotor axis towards the peripheral rim of the rotor 10. When the emulsion reaches the peripheral area of the second mixing stage, it is forced to enter another duct 11 connecting a peripheral outlet 12 from the second stator-rotor device to an axial inlet 13 in the successive stator-rotor device. The emulsion is forced by the rotation of the rotor 14 to flow from the rotor axis to the peripheral rim of the rotor 14 and then it is discharged from the third mixing stage through a duct 15.

Figure 2:
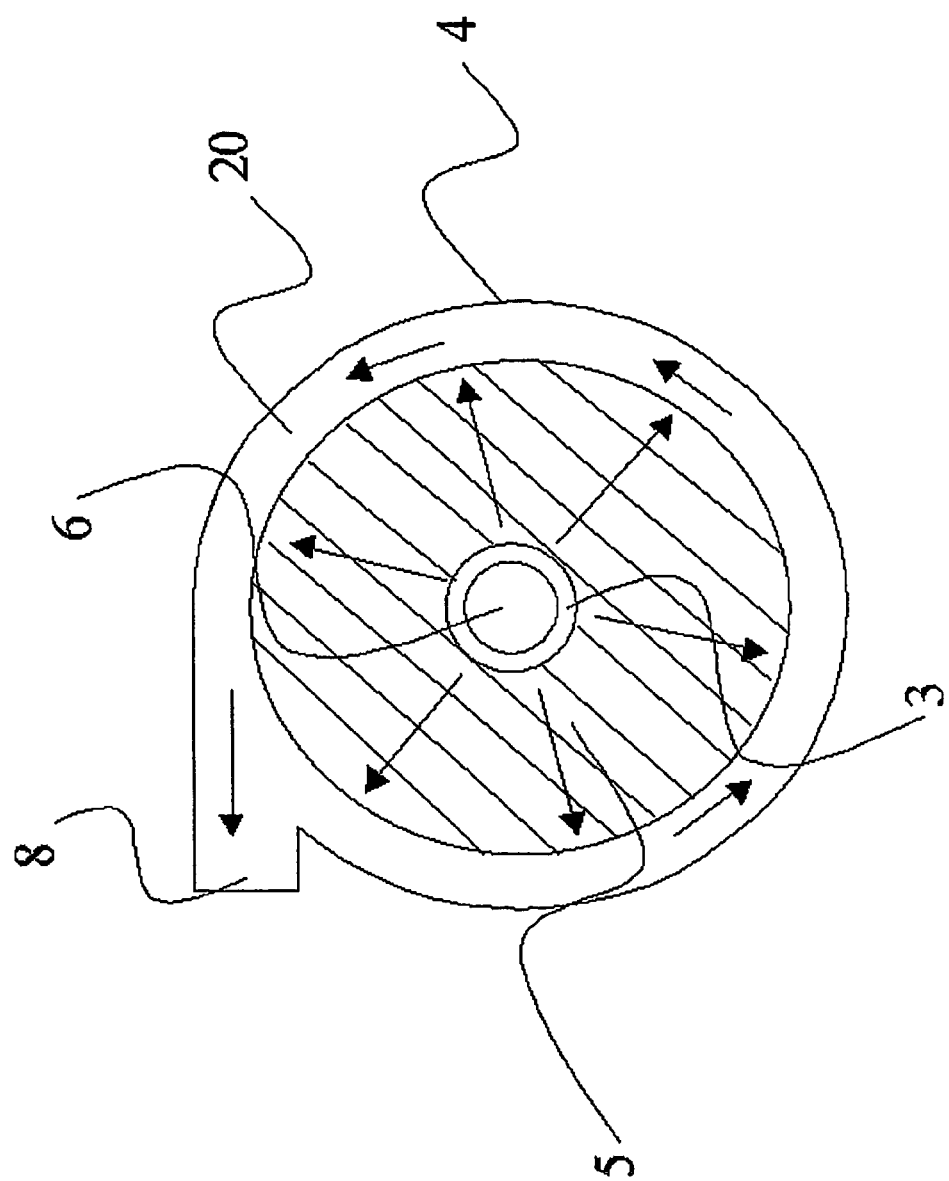
FIG. 2 is a front view of the first rotor-stator device of the same apparatus shown in FIG. 1.

With reference to FIG. 2, a front view of the first rotor-stator device of FIG. 1 is shown. An axial inlet 3 of the two immiscible liquids is provided around the rotation axis 6 of the first rotor 5. The entering liquids are forced by the rotation of the rotor 5 to flow from the axial inlet 3 towards the peripheral rim of the rotor 5, as indicated by the radial direction of the arrows in FIG. 2. Afterwards, the so-formed emulsion flows at a high velocity inside the restricted volume 20 comprised between the peripheral rim of the rotor 5 and the corresponding stator 4, before being discharged from the first rotor-stator device via the peripheral outlet 8, which has preferably a tangential direction with respect to the rotor circumference.

The emulsions obtained by the process of the present invention have shown excellent properties as regards the size distribution of the droplets and the morphological properties of the products obtained by quenching the droplets.

In fact, the most important application of the process of the invention is the continuous preparation of emulsions, which, once quenched under suitable conditions, give rise to the formation of solid particles having a more uniform size distribution. A preferred method for cooling the emulsion is described in the Applicant's patent application WO 02/051544. According to this patent, the emulsion containing droplets of the above molten adduct is cooled by transferring it into a cooling bath, which contains a refrigerating liquid moving inside a tubular zone. As taught in this patent, the ratio $v_e/v_{ref}$ between the velocity of the emulsion ($v_e$) discharged from the rotor-stator device of the invention and the velocity of the refrigerating liquid ($v_{ref}$) should be maintained in the range from 0.25 to 4, preferably from 0.5 to 2, in order to obtain the best results in term of particle size distribution.

The solidification of the magnesium dihalide-Lewis base adduct, contained in the emulsion in form of droplets, gives solid particles, which, in view of their narrow particle size distribution, can be advantageously used as a support in the preparation of supported catalysts for the polymerization of olefins.

In fact, in the preparation of supported catalysts for the polymerization of olefins, it is highly desirable to obtain a size distribution of the support particles as much as possible narrow in the ranges of average values requested in this specific application.

The support particles obtained by quenching the above obtained emulsion are characterized by an average size in the range of from 4 to 120 μm.

The particle size distribution can be valued according to the P90–P'10/P50 where, in a particle size distribution curve, P90 is the value of the diameter such that 90% of the total particles have a diameter lower than that value, P10 is the value of the diameter such that 10% of the total particles have a diameter lower than that value and P50 is the value of the diameter such that 50% of the total particles have a diameter lower than that value. It is clear that a low SPAN value implies a narrow particle size distribution.

In the particular case of an adduct of formula $MgCl_2 \cdot mROH$ wherein m ranges from 0.1 to 6, and R is an alkyl group containing from 1 to 10 carbon atoms, the process of the invention allows to obtain a droplet size distribution according to the formula P90–P10/P50 of less than 1.2 and preferably of less than 1.0.

The process provided by the present invention is extremely advantageous since it allows to select the average value of the particle size distribution in a wide range (4-120 μm), while maintaining a narrow size distribution of the particles (SPAN<1.2). These results are shown in the working examples of the present patent application and are obtained without the addition to the emulsion of chemical compounds, surfactants and other additives. As said, these chemical compounds are not compatible with the preparation of solid catalytic components, since they can cause a drastic reduction of the activity of the final catalyst. The obtainment of solid catalytic components having a distribution curve as much as possible narrow reduces also the formation of fines during the polymerization of α-olefins. This is particularly advantageous because in a gas-phase polymerization process the fines are responsible of the formation of electrostatic charges inside the polymerization reactor and can easily cause the fouling of the reactor walls. Furthermore, the fines are easily entrained by gaseous stream recycled to the bottom of the polymerization bed for cooling the reactor and this recycle of fines is not desired.

The following examples have to be considered representative and non-limiting the scope of the invention.

EXAMPLES

In examples 1-3 the process of the invention is carried out according to the embodiment shown in FIG. 1 where three mixing stages are used.

The comparative example 4 is carried out in a single-stage apparatus comprising only the first rotor-stator device of FIG. 1 (stator 4 and rotor 5), from which the obtained emulsion is discharged without passing to the successive rotor-stator devices.

The below mentioned parameters can be defined as follows:

$Re_T = D \cdot v \cdot d/\eta$, wherein D is the tube diameter, v is the linear velocity of the fluid, d is the fluid density and η is the fluid dynamic viscosity;

Peripheral velocity=product of rotor angular velocity multiplied by radius of the rotor; SPAN=P90–P10/P50 wherein P90 is the value of the diameter such that 90% of the total particles have a diameter lower than that value, P10 is the value of the diameter such that 10% of the total particles have a diameter lower than that value and P50 is the value of the diameter such that 50% of the total particles have a diameter lower than that value.

Example 1

The following liquid components are fed at 125° C. to the axial inlet of the first rotor-stator device:
a mineral oil (dynamic viscosity at 40° C. of 52 cPoise and density of 865 kg/m³) as the continues phase of the emulsion;
a molten adduct of formula $MgCl_2 \cdot 2.7C_2H_5OH$ as the dispersed phase of the emulsion.

The feeding ratio (by weight) between the above molten adduct and the above mineral oil is 0.13.

The operative conditions are such that the residence time inside each rotor-stator device is maintained at a value of 0.1 seconds, while the peripheral velocity of the rotor disks is 7.0 m/s. The $Re_T$ inside the ducts connecting the mixing stages is of about 8200.

An emulsion comprising the molten adduct as the dispersed phase and the above mineral oil as the continues phase is discharged from the outlet of the third mixing stage. The quenching of the obtained emulsion leads to obtain solid particles having an average size of 68 μm and SPAN=1.0. Therefore, solid particles characterized by a particularly narrow size distribution are obtained.

Example 2

The two immiscible liquids of Example 1 are fed to the axial inlet of the first rotor-stator device with the same feeding ratio between the molten adduct and the mineral oil.

The operative conditions are such that the residence time inside each rotor-stator device is maintained at a value of 0.1 seconds, while the peripheral velocity of the rotor disks is 56.0 m/s. The $Re_T$ inside the ducts connecting the mixing stages is of about 8400.

An emulsion comprising the molten adduct as the dispersed phase and the above mineral oil as the continuos phase is discharged from the outlet of the third mixing stage. The quenching of the obtained emulsion leads to obtain solid particles having an average size of 12 μm and SPAN=0.9.

Example 3

The two immiscible liquids of Example 1 are fed to the axial inlet of the first rotor-stator device at a feeding ratio (by weight) between the molten adduct and the mineral oil of 0.07. The operative conditions are such that the residence time inside each rotor-stator device is maintained at a value of 0.1 seconds, while the peripheral velocity of the rotor disks is 56.0 m/s The $Re_T$ inside the ducts connecting the mixing stages is of about 8000.

An emulsion comprising the molten adduct as the dispersed phase and the above mineral oil as the continuos phase is discharged from the outlet of the third mixing stage.

The quenching of the obtained emulsion leads to obtain solid particles having an average size of 9.5 μm and SPAN=0.8.

Example 4 (Comparative)

The same two immiscible liquids of the previous examples are fed to the axial inlet of a single-stage apparatus comprising only a single rotor-stator device.

The feeding ratio (by weight) between the molten adduct and the mineral oil is maintained at 0.13. The same operative conditions of Example 2 are established: the residence time inside the rotor-stator device is maintained at 0.1 seconds, while the peripheral velocity of the rotor disks is of 56 m/s.

An emulsion comprising the molten adduct as the dispersed phase and the above mineral oil as the continues phase is discharged from the outlet of said rotor-stator device. The quenching of the obtained emulsion leads to obtain solid particles having an average size of 16 μm and SPAN=1.4. As known to those skilled in the art of catalyst solid supports, the obtained particles are therefore characterized by a broad size distribution. Thus, the solid particles obtained in this comparative example need to be sieved, before their use in the preparation of supported catalysts for the olefin polymerization.

The invention claimed is:

1. A multistage process fly the continuous production of an emulsion comprising as a dispersed phase, a molten adduct of magnesium dihalide-Lewis base, the process comprising subjecting at least two immiscible liquids to a sequence of at least two mixing stages carried out in at least two successive stator-rotor devices each comprising at least one rotor disk and at least one stator, the at least one rotor disk having a peripheral velocity, wherein:

a peripheral outlet from a first stator-rotor device is connected to an axial inlet in a successive stator-rotor device by means of a duct having a spiral shape comprising an initial portion and an end portion, in which a Reynolds number $Re_T$ inside said duct is higher than 5000, the initial portion of the duct being oriented in a direction substantially tangential to the circumference of the rotor; and the peripheral velocity of each rotor of said stator-rotor devices ranges from 5 to 60 m/s.

2. The process according to claim 1, wherein said emulsion comprises, as a continuous phase, a liquid which is inert and immiscible with said molten adduct of magnesium dihalide-Lewis base.

3. The process according to claim 2, wherein said inert and immiscible liquid is selected from aliphatic and aromatic hydrocarbons, silicone oils, liquid polymers or mixtures of said compounds.

4. The process according to claim 2, wherein said molten adduct of magnesium dihalide-Lewis base is fed to said first stator-rotor device at a weight ratio of less than 0.5 with respect to said inert and immiscible liquid.

5. The process according to claim 1, wherein in each mixing stage a residence time is of less than 1 second.

6. The process according to claim 1, wherein the peripheral velocity of the at least one rotor disk is comprised in the range from 20 to 60 m/sec.

7. The process according to claim 1, wherein the Reynolds number $Re_T$ inside said duct is higher than 8000.

8. The process according to claim 1 comprising a sequence of three mixing stages.

9. The process according to claim 1, wherein said magnesium dihalide is magnesium chloride.

10. The process according to claim 1, wherein said Lewis base is selected from amines, alcohols, esters, phenols, ethers, polyethers, aromatic or aliphatic (poly)carboxylic acids.

11. The process according to claim 10, wherein said Lewis base is an alcohol of formula ROH, in which R is an alkyl group containing from 1 to 10 carbon atoms.

12. The process according to claim 1, wherein the molten adduct is $MgCl_2 \cdot mROH \cdot nH_2O$, wherein m=0.1-6.0, n=0-0.7 and R=alkyl group $C_1$-$C_{10}$.

13. The process according to claim 12, wherein m=2.0-4.0, n=0-0.4 and R=ethyl group.

14. The process according to claim 1, wherein the end portion of the duct is oriented in a direction substantially parallel to the rotation axes of each rotor.

15. The process of claim 1 wherein rotation or the rotor forces the emulsion to flow from the rotor axis towards the peripheral rim of the rotor.

* * * * *